United States Patent [19]

Chuang

[11] Patent Number: 5,685,026
[45] Date of Patent: Nov. 11, 1997

[54] STRUCTURE OF TOILET BOWL

[76] Inventor: Ming-Jung Chuang, No. 57, Sec. 3, Chang-Chin N. Road, Taipei, Taiwan

[21] Appl. No.: 630,976

[22] Filed: Apr. 12, 1996

[51] Int. Cl.$^6$ .................................................. E03D 1/14
[52] U.S. Cl. ................................... 4/364; 4/346; 4/326
[58] Field of Search ............................... 4/363, 364, 324, 4/325, 326, 415, 345, 346

[56] References Cited

U.S. PATENT DOCUMENTS

| | | | |
|---|---|---|---|
| 520,358 | 5/1894 | Howell | 4/364 |
| 4,561,131 | 12/1985 | David | 4/326 |
| 4,969,218 | 11/1990 | Comparetti | 4/324 |
| 5,548,850 | 8/1996 | Geeham | 4/363 |

*Primary Examiner*—Henry J. Recla
*Assistant Examiner*—Charles R. Eloshway
*Attorney, Agent, or Firm*—Bacon & Thomas

[57] ABSTRACT

A toilet structure having lower and upper water tanks, the latter being fixed on the former, a lower outlet on the bottom of the lower water tank for supplying water from the lower tank to a whirling water feed outlet in an associated nightstool, an upper outlet on the bottom of said upper tank for supplying water from the upper water tank to a ring of holes formed in an upper periphery of the nightstool. When a rotatable knob is turned in a first direction, a small amount of flushing water is discharged from the lower tank through the lower outlet to flush urine from said nightstool. When the knob is turned in a second direction, both the water tanks discharge water simultaneously for flushing nightsoil from the nightstool. By such structure, water consumption is reduced.

4 Claims, 8 Drawing Sheets

STRUCTURE OF TOILET BOWL

BACKGROUND OF THE INVENTION

1. Field of the Invention

The present invention is directed to a structure of a toilet bowl, and especially to a toilet bowl having upper and lower water tanks, water flushing with small amount of water to flush urine is executed by a single water tank, while work for flushing nightsoil with large amount of water is executed by both the tanks, in this way, water consumption can be reduced.

2. Description of the Prior Art

A conventional structure of a toilet bowl is provided with an outlet on the bottom of a single water tank, the outlet is connected respectively with a whirling water feed outlet provided at the lower portion of the nightstool as well as with a ring of holes for forming water jets at the upper periphery of the nightstool. When a user pushes down the control button on the water tank, water discharged from the feed outlet provided at the lower portion of the water tank can be given through the whirling water feed outlet to flush down onto the water seal in the nightstool to clear the discharge therein, and is given through the ring of holes for forming water jets to flush the inner surface of the nightstool, cleansing work after using thus is completed. And more, the push button discharging structure of the toilet bowl is designed to have a valve which keeps opened during water flushing, a user only needs to push down the push button, the flush valve can keep opened all the way of flushing, until water storaged in the water tank is discharged completely out of the outlet, then the flush valve will be closed to seal the outlet again. In this way, amount of flushing water in the toilet bowl will be kept constant no matter in which case the user pushes down to flush; when there is only urine to be cleared away, such amount of water consumption makes wasting, this is unappropiate in the area lack of water resources, and thus needs to be improved.

The inventor of the present invention has designed and improved on the structure of toilet bowls based on his professional experience on designing and producing toilet equipments for years. In the primary stage of his study, he designed the single water tank to go with two stages of water discharging, in the first stage, water amount of discharging is smaller and is used to only clear away urine; while in the second stage, water amount of discharging is larger and is used to flush nightsoil, therefore, waste of water can be avoided, However, the above stated two stage discharging mode has the disadvantage of, according to trailing investigation of the inventor, ineffective cleansing with small amount of water, although waste of water is avoided. This is because mainly of the flushing structure of the nightstool itself, as stated above, includes separately a whirling water feed outlet and a ring of holes for forming water jets. In the case of small amount of water, water too is divided into two streams, the whirling water at the lower portion of the nightstool can be too small to form a whirl for removing the urine in the water seal; on the other hand, amount of water through the ring of holes can be too small to cleanse the inner surface of the nightstool, thus ineffective and imperfect flushing is resulted.

SUMMARY OF THE INVENTION

In view of the above statement, firstly, the gist of the present invention is to provide a structure of toilet bowl having upper and lower water tanks, wherein, the outlet of the upper water tank is connected with a ring of feed holes for forming water jets at the upper periphery of the nightstool, while the lower water tank is connected with a whirling water feed outlet provided at the lower portion of the nightstool, when it is to remove urine in the nightstool, water can be fed directly from the lower water tank to the ring of feed holes for creating whirling water to remove the urine in the water seal, alternatively, water in the upper water tank can be used to flush the inner surface of the nightstool to dilute urine, hence there is no problem of inefficient flushing by dividing water into two streams; when it is to remove nightsoil in the nightstool, water in the upper and lower water tanks can be discharged together, this can remove the discharge in the water seal on one hand, and can cleanse the inner surface of the nightstool on the other hand. Thereby, cleansing effect can be achieved, no matter a single water tank is used to flush and remove urine or the upper and lower water tanks are used to flush and remove nightsoil; besides, if a single water tank is used to flush and remove urine, much water can be saved. Accordingly, the primary object of the present invention is to completely clear discharge in the nightstool and to save water.

The present invention will be apparent concerning its practice after reading the detailed description of the preferred embodiments thereof in reference to the accompanying drawings.

DETAILED DESCRIPTION OF THE PREFERRED EMBODIMENT

Figure 1:
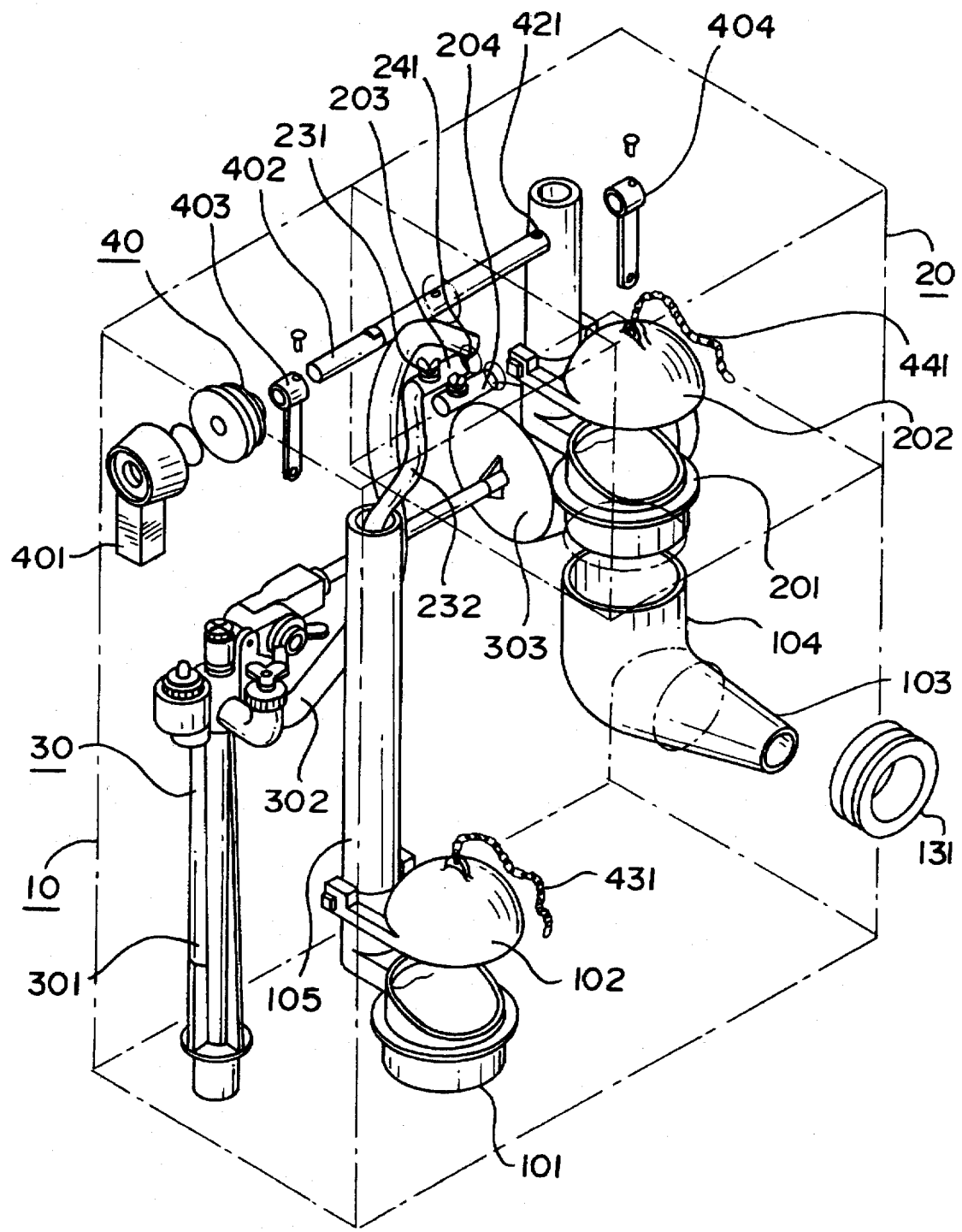
FIG. 1 is a perspective anatomic view of the present invention.
Figure 2:
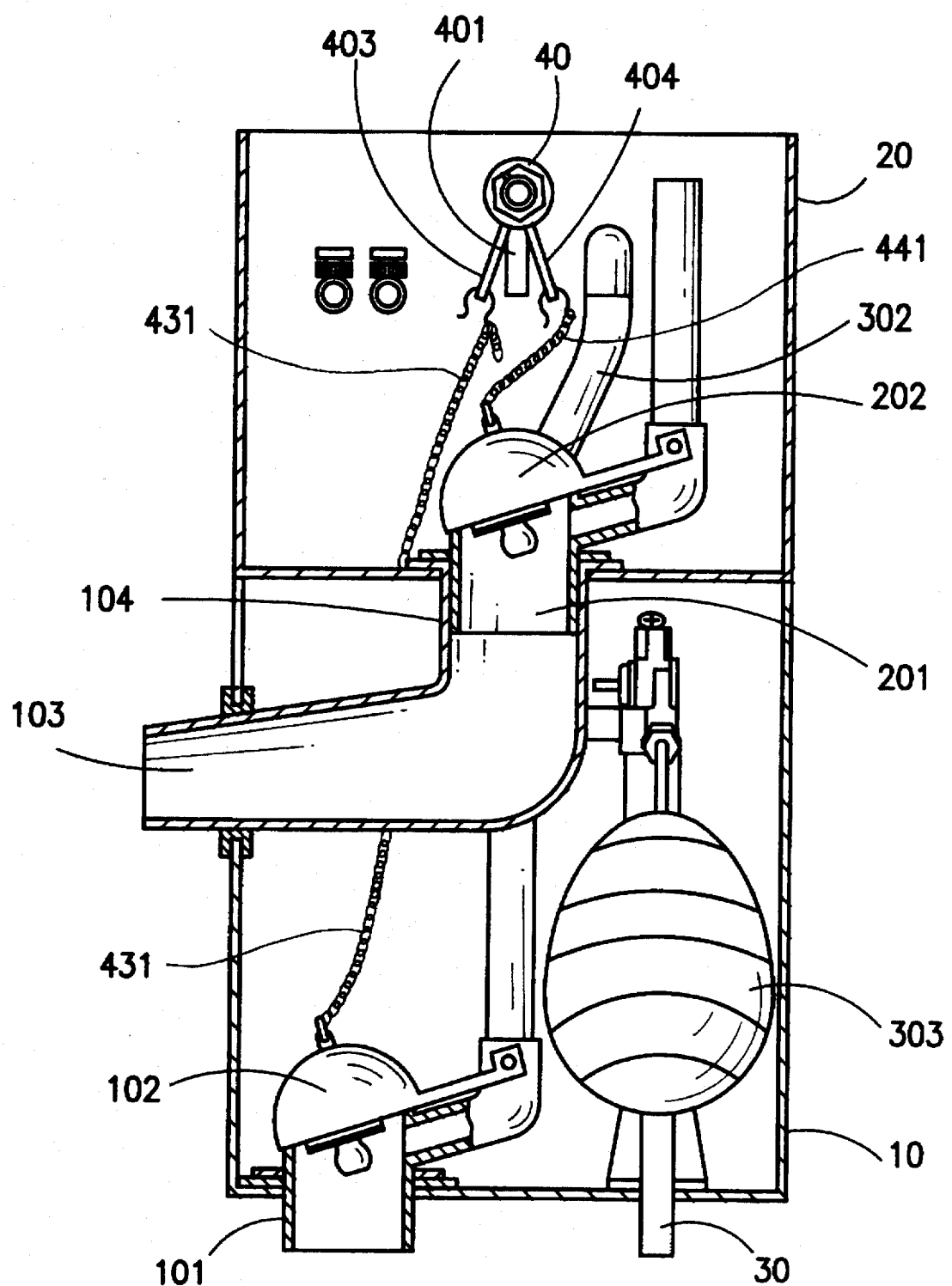
FIG. 2 is a side sectional view of the present invention after assembling.

From FIGS. 1 and 2, we can see the structure of the toilet bowl of the present invention, it is comprised of a lower water tank 10 and an upper water tank 20 as well as an intake device 30 and a rotatable knob set 40, wherein:

the lower water tank 10 has a lower outlet 101 provided on the bottom thereof, the lower outlet 101 is connected to a whirling water feed outlet of the nightstool and has on the top thereof a lower floating plug 102 which is the same as a conventional floating plug and which is used to control opening/closing of the lower outlet 101. The lower water tank 10 further has on the front side thereof a connecting pipe 103 which is extended through the wall of the lower water tank 10 and is connected externally to a ring of holes for forming water jets at the upper periphery of the nightstool, and is bonded internally upwards to extend to a connection 104, in order to prevent from water leakage at the connecting pipe 103, a rubber washer 131 is provided at the connection between the external surface of the connecting pipe 103 and the wall of the lower water tank 10. The lower water tank 10 has a water spillover pipe 105 by the lower outlet 101, the water spillover pipe 105 is the same as a conventional one, is opened on the top thereof and is slightly higher than the full load level of the lower water tank 10, the bottom thereof is communicated with the lower outlet 101.

The upper water tank 20 is fixed on the upper portion of the lower water tank 10, an upper outlet 201 is provided on the bottom end thereof, the bottom of the upper outlet 201 is extended to slip over the connection 104 whereby it is communicated through the connecting pipe 103 with the ring of holes for forming water jets at the upper periphery of the nightstool, on the top of the upper outlet 201 there is an upper floating plug 202 which is the same as a conventional floating plug and which is used to control opening and closing of the upper outlet 201. A water complementary pipe 203 for complementing water seal with water and a water spilling pipe 204 are provided on a lateral side of the upper water tank 20 and on the top of and inside the lower water tank 10, the water complementary pipe 203 is flush with the water spilling pipe 204, but is a little higher than the full load level of the upper-water tank 20, water output of these pipes can be controlled respectively by control knobs 231 and 241; the water complementary pipe 203 is connected to the water spillover pipe 105 via a soft pipe 232, while water in the water spilling pipe 204 drops directly into the storage space of the lower water tank 10.

The intake device 30 is provided in the lower water tank 10, and is connected directly to a water feeding system for a building, it includes a lower intake pipe 301, an upper intake pipe 302 and a float 303 with a link; the lower intake pipe 301 can feed water into the lower water tank 10, while the upper intake pipe 302 can feed water into the upper water tank 20, the float 303 with the link is provided in the lower water tank 10 as is the conventional one and can be moved up and down in pursuance of the water levels of the lower water tank 10, when it is raised to the full load level of the lower water tank 10, the intake device 30 will stop water feeding, meantime, the lower intake pipe 301 and the upper intake pipe 302 will stop complementing water for the lower water tank 10 and the upper water tank 20.

Figure 5:
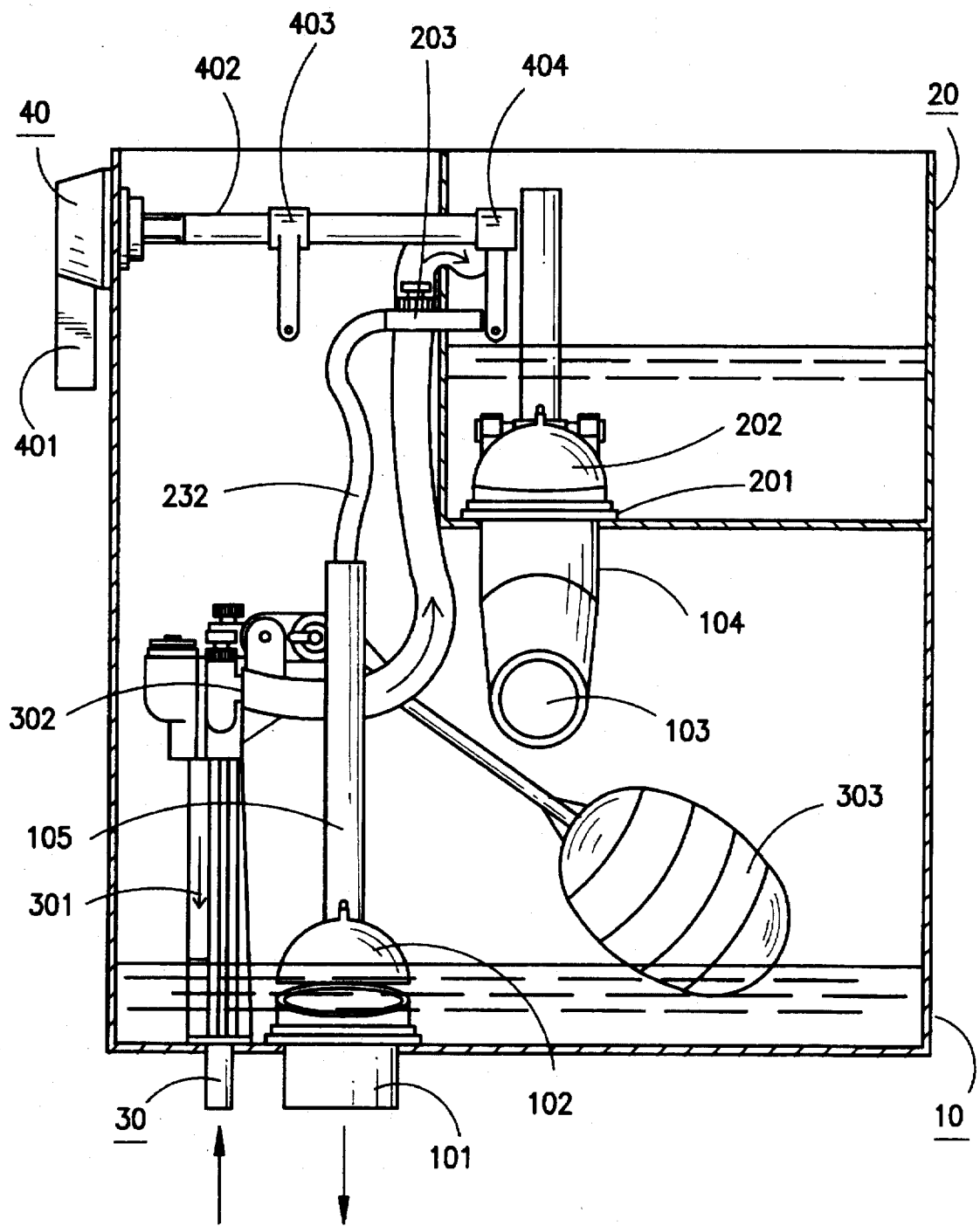
FIG. 5 is a schematic view of the present invention showing feeding of water for storage.

The rotatable knob set 40 further comprises a two phase rotatable knob 401, a link 402, a first drag stem 403 and a second drag stem 404. Wherein, the rotatable knob 401 is provided on the external surface of the lower water tank 20, and can be pivoted to get into any of the two phases; the link 402 is connected to the internal end of the rotatable knob 401 and is extended in the lower water tank 10, the end thereof is extended into the upper water tank 20. When the rotatable knob 401 is rotated, the link 402 is rotated therewith; the first drag stem 403 is fixed in the middle of the link of the rotatable knob set 40 (as shown in FIG. 5) which is within the lower water tank 10, the tailing end thereof is provided with a first draging rope 431 which is connected with the lower floating plug 102; the second drag stem 404 is fixedly provided at the end of the rotatable knob set 40 which is within the upper water tank 20, the tailing end thereof is provided with a second draging rope 441 which is connected with the upper floating plug 202. For convenience of assembling, the rotatable knob set 40 can, as shown in these drawings, be provided with fixing holes 421 in the link 402, when in assembling, the link 402 is extended through the upper and lower water tanks 20, 10, after the rotatable knob 401 is secured, the second and the first drag stems 404, 403 can be mounted by slipping over at the above stated positions and are secured by bolts or pins in the fixing holes 421, in this simple way, assembling of the rotatable knob set 40 is completed.

The structure of the toilet bowl of the present invention can be further understood by illustration of the drawings from FIGS. 3 to 8.

Figure 3:
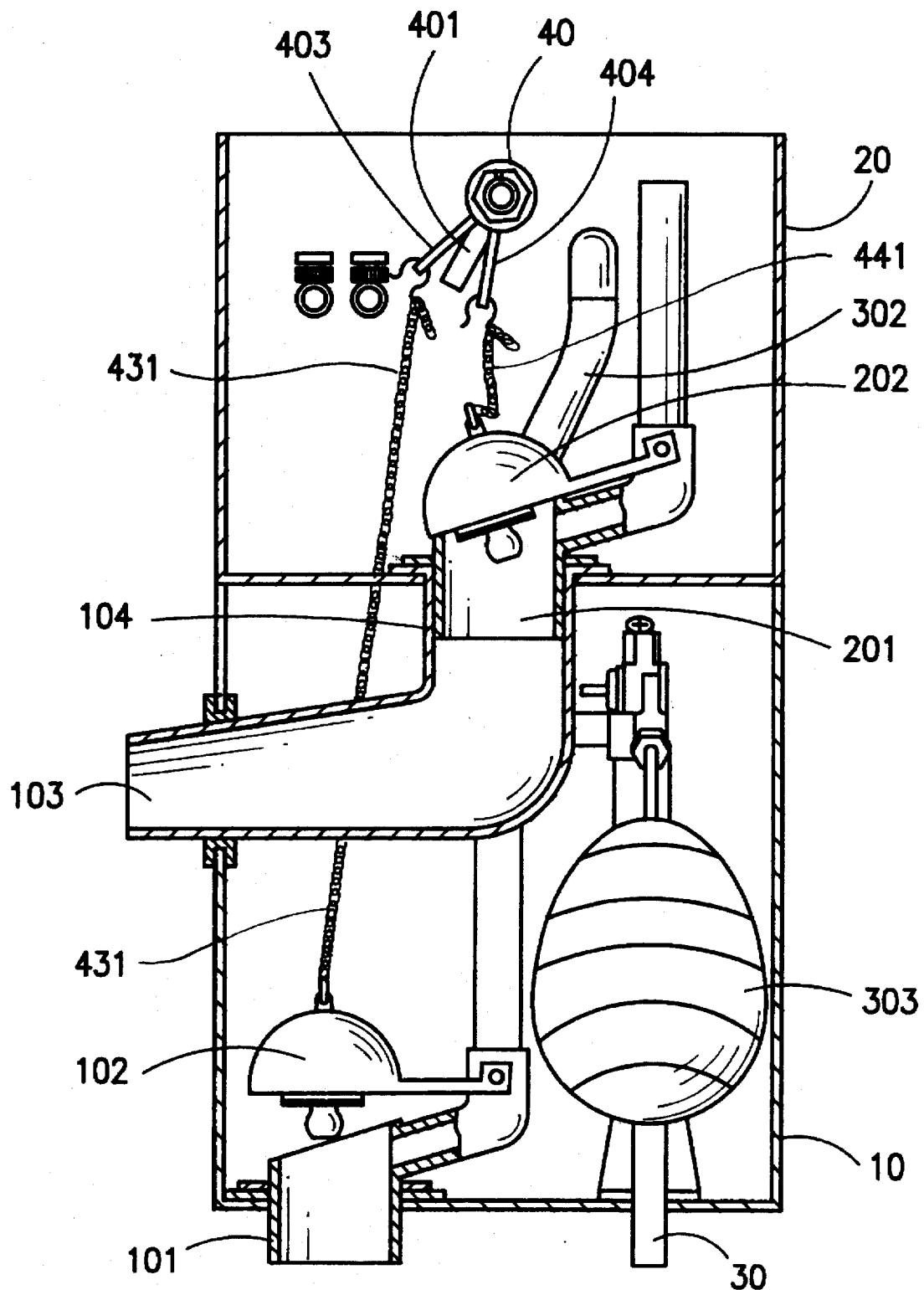
FIG. 3 is a schematic view of the present invention showing discharging of the lower water tank.

Referring to FIG. 3, when the lower water tank 10 and the upper water tank 20 get respectively their full load levels, and when the rotatable knob 401 is turned to result a small flushing of water, the second and the first drag stems 404, 403 will be turned to the same direction, the first drag stem 403 can pull up the first draging rope 431, and in turn pull up the lower floating plug 102, so that the lower outlet 101 sealed by the lower floating plug 102 can be in an open state, water stored in the lower water tank 10 can flow through the lower outlet 101 to the whirling water feed outlet provided at the lower portion of the nightstool, in this way, water seal in the nightstool will create a whirl and remove the discharge therein rather than just dilute it, and change water to form a new water seal. Turning of the second drag stem 404 turned synchronically with turning of the first drag stem 403 during adjusting of the rotatable knob 401 to result a small flushing water is not capable of rendering the second draging rope 441 to pull up the upper floating plug 202, so that the upper water tank 20 keeps its full load level, the small flushing water can reduce water consumption and save water in the upper water tank 20, yet water in the water seal can be changed to form a new water seal, this is suitable for clearing urine in the nightstool.

Figure 4:
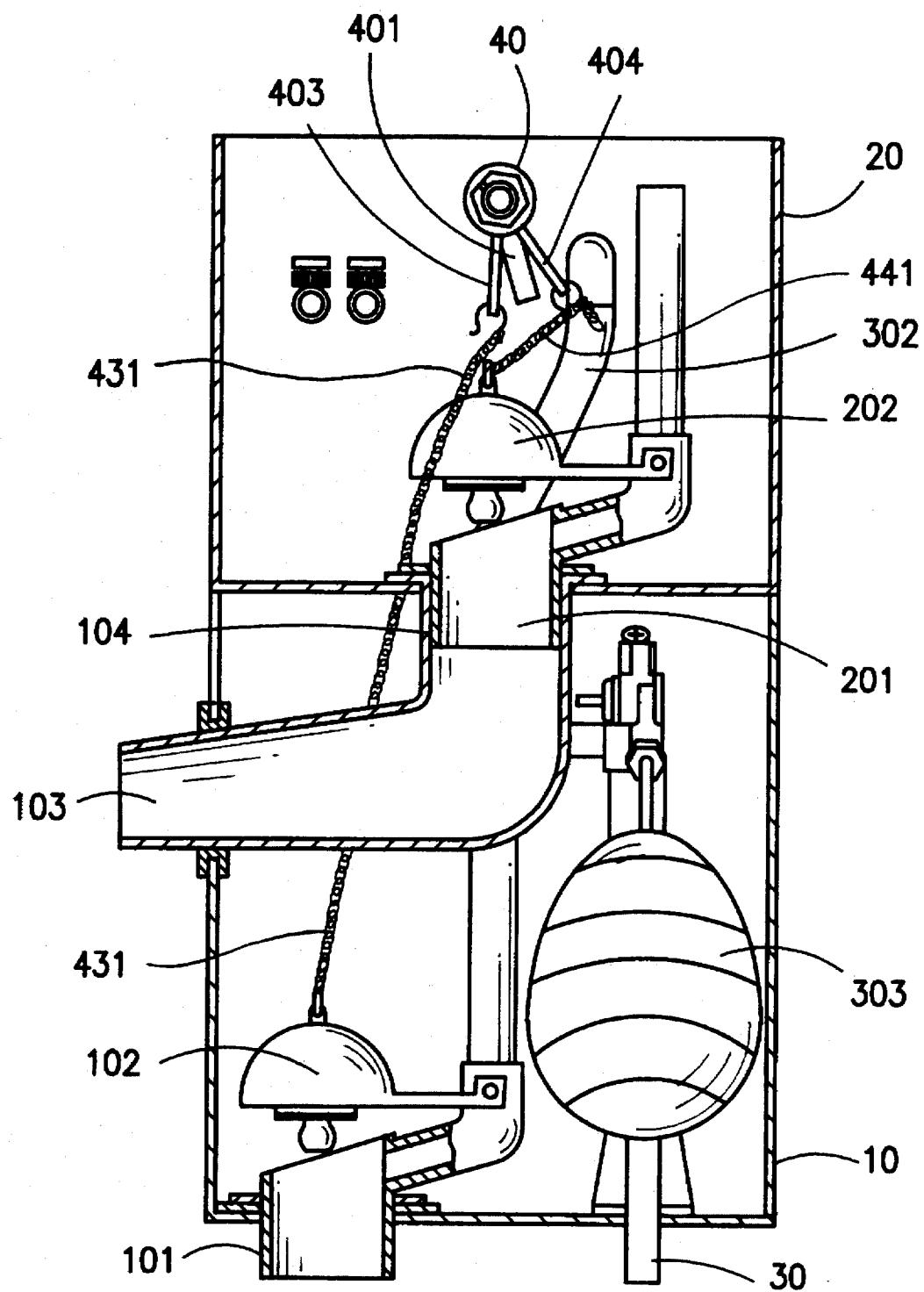
FIG. 4 is a schematic view of the present invention showing discharging of the upper and the lower water tanks.

Referring to FIG. 4, when a user turn the rotatable knob 401 to get a large flushing water, the second and the first drag stems 404, 403 still will be turned simultaneously, the first drag stem 403 can open the lower outlet 101 of the lower water tank 10 as stated above to generate whirling water in the nightstool; while turning of the second drag stem 404 can pull up the upper floating plug 202 via the second draging rope 441 due to difference of rotating direction or angular distance between the second and the first drag stems 404, 403, thereby the upper outlet 201 of the upper water tank 20 is opened, water in the upper water tank 20 is discharged from the upper outlet 201 through the connection 104 and the connecting pipe 103 to flow to the ring of holes for forming water jets to cleanse the inner surface of the nightstool, plus discharging of the whirling water from the lower water tank 10 to the nightstool, nightsoil in the nightstool can thus be flushed and cleared.

Figure 6:
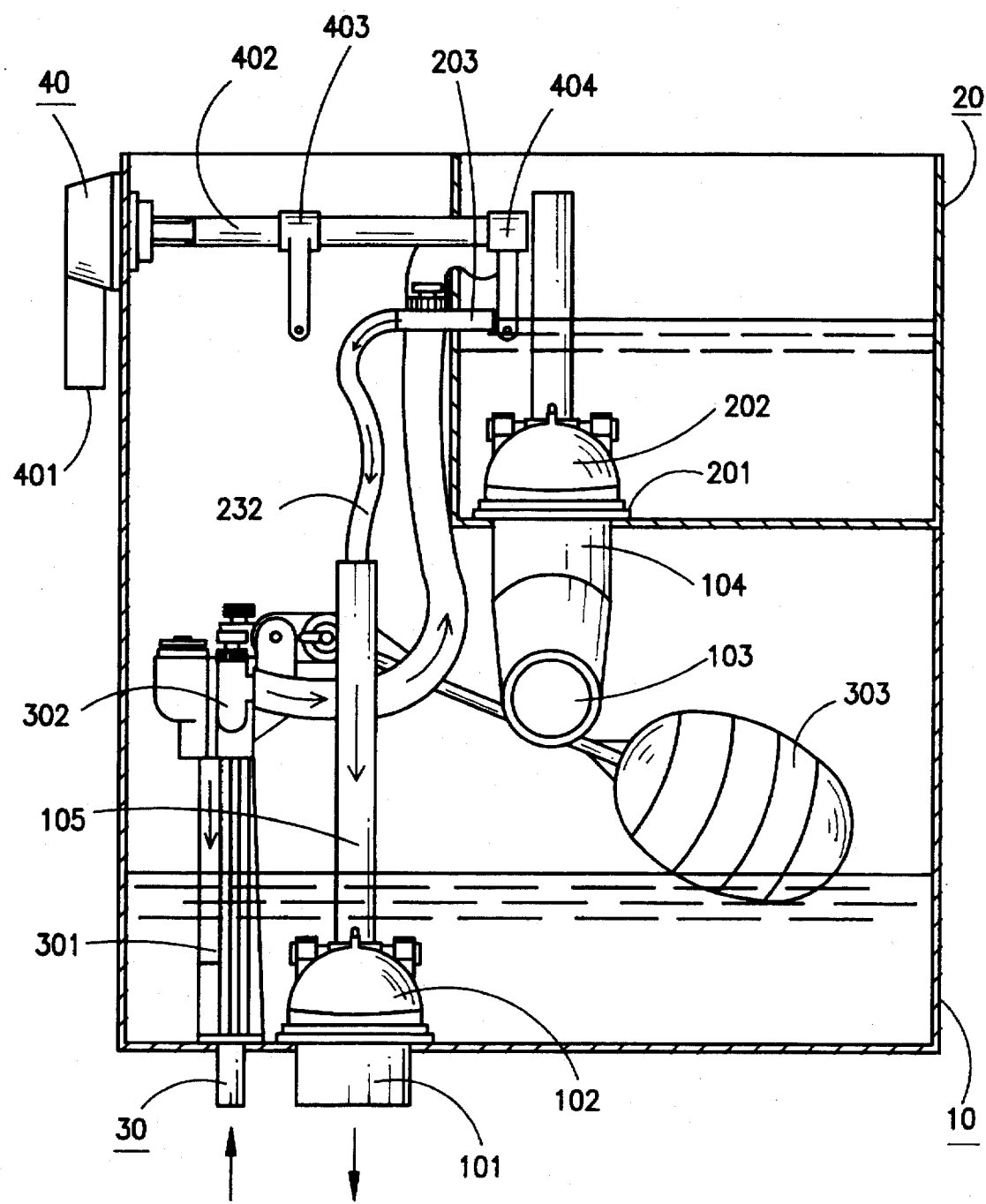
FIG. 6 is a schematic view of the present invention showing inflow of water when the upper water tank is full with water.
Figure 7:
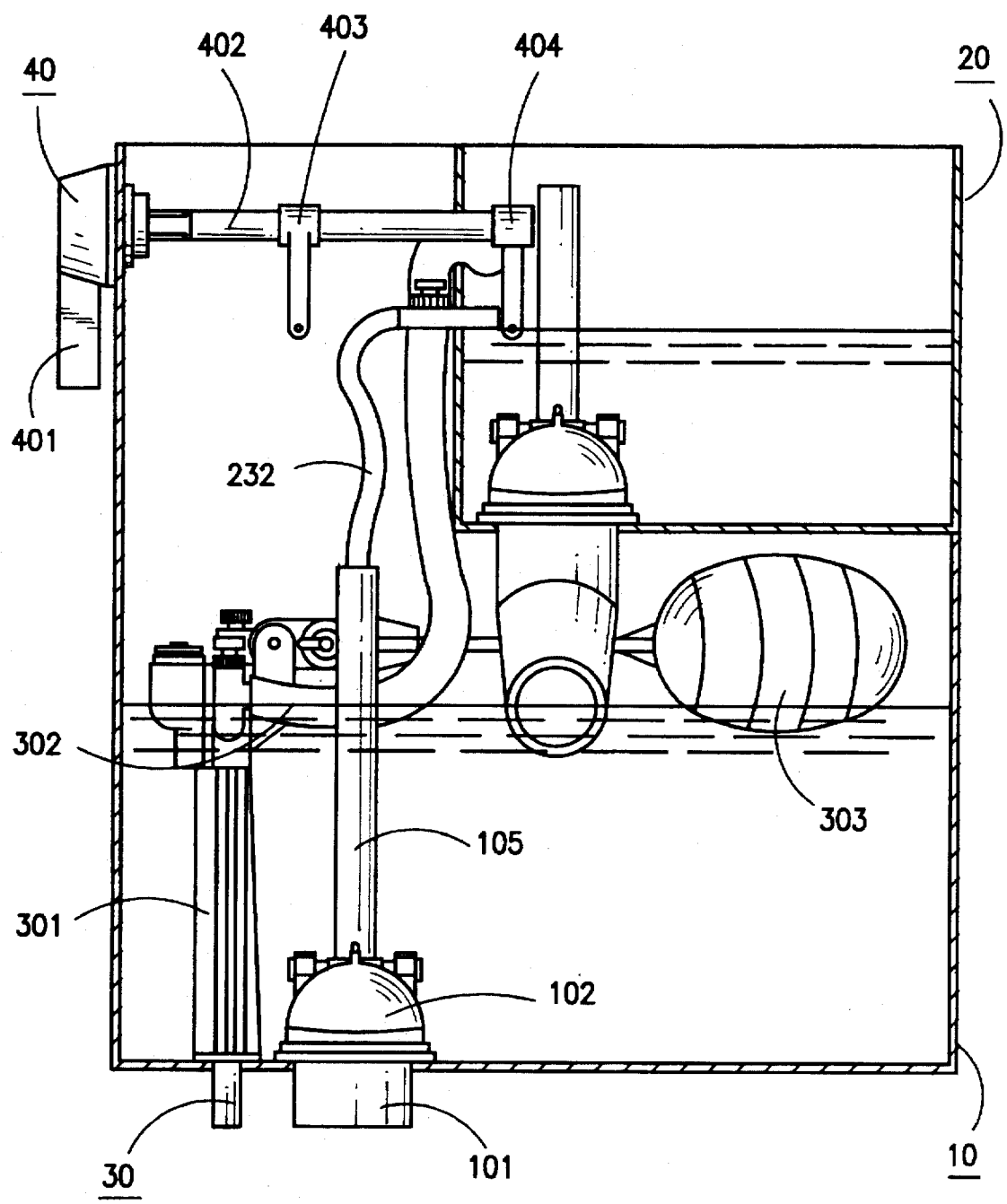
FIG. 7 is a schematic view of the present invention showing completion of feeding of water.

Referring now to FIGS. 5 to 7, to result small or large flushing of water, whichever will be the case, water in the lower water tank 10 can be given out to lower the water level, the aforesaid float 303 connected with a link is lowered thereby, the intake device 30 will start to let in water, when it intakes water, the lower intake pipe 301 can feed water into the lower water tank 10, while the upper intake pipe 302 can feed water into the upper water tank 20. At the moment, if it is the case to get large flushing water in the above discharging operation, the lower and the upper water tanks 10, 20 will soon be empty, water is let in to make full load of lower water tank 10, until the float 303 rises to shut the intake device 30. However, if it is the case to get small flushing water in the above discharging operation, only the lower water tank 10 will be exhausted, while the upper water tank 20 is still fully loaded, the intake device 30 will start to let in water, the lower intake pipe 301 can too feed water into the lower water tank 10, while the upper intake pipe 302 can too feed water into the upper water tank 20, but water will spill over because the upper water tank 20 is already full loaded. When water level in the upper water tank 20 rises to the height where the water complementary pipe 203 and the water spilling pipe 204 are located, water flowing into the water spilling pipe 204 will drop down into the lower water tank 10 and speeds feeding of water into the lower water tank 10, while water flowing into the water complementary pipe 203 will flow to the water seal at the bottom of the nightstool due to its connection with the water spillover pipe 105 of the lower water tank 10.

It should be explained here that, the primary function of the water seal is to seal against the drain pipe beneath the nightstool, so that to prevent from emission of bad order in the drain pipe out of the bottom of the nightstool; besides, the water seal is a necassary condition for drainage; water level of the water seal in a siphonic nightstool must be higher, therefore, water level of the water seal of a nightstool will be varied in pursuance of various designs of the manufacturers. In view of this, in the case of getting large flushing water in the above discharging operation, when the lower water tank 10 of the present invention discharges to complete changing of water seal in the nightstool, water from the upper water tank 20 and flowing through the above mentioned ring of holes can supplement water for the new water seal; while in the case when only the lower water tank 10 flushes water down, water level of the water seal in the nightstool will be lower than that of the normal standard due to lacking of extra complement of water, at the moment, the aforesaid water flowing into the water complementary pipe 203 from the upper water tank 20 can flow through the water spillover pipe 105 to complement and raises the level of the new water seal in the nightstool, this is what the water complementary pipe 203 functions, meantime, adjustment of water flow can be controlled by the control knob 231 on the water complementary pipe 203 so as to be adapted to various water level requirement of the water seal in the nightstool.

The present invention is characterized in the design of the lower water tank 10 and the upper water tank 20, wherein, the lower water tank 10 is connected to the whirling water feed outlet provided at the lower portion of the nightstool, while the upper water tank 20 is connected to the ring of holes for forming water jets at the upper periphery of the nightstool, thereby, when it is the case to take advantage of small flushing water, only a single water tank is used, when it is the case to take advantage of large flushing water, the lower water tank 10 and the upper water tank 20 are used together, in this way, water consumption can be reduced.

Figure 8:
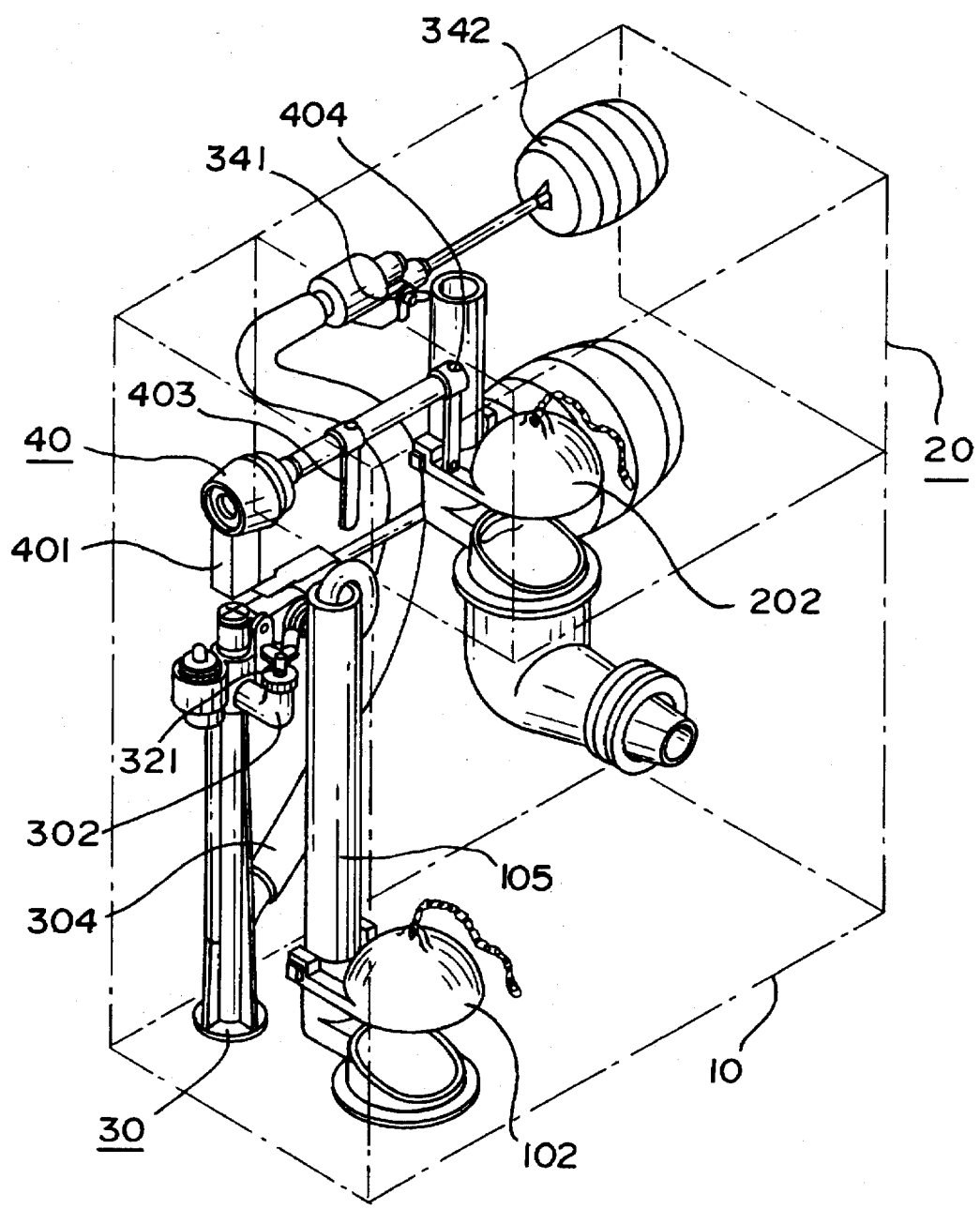
FIG. 8 is a view of another embodiment of the present invention.

The present invention can also be fullfilled by another embodiment. Referring to FIG. 8, the upper intake pipe 302 of the intake device 30 is connected to the water spillover pipe 105 and is provided with a control knob 321 to adjust water output, this structure of device is used for complementing water in the water seal in the nightstool, the intake device 30 is further diverged to connect with a water feed pipe 304 which is in turn connected to the upper water tank 20, a water output control knob 341 and an upper float 342 with its link are provided on the end of the water feed pipe 304, the upper float 342 and its link are provided in the upper water tank 20, when the upper water tank 20 is fully loaded and thereby the upper float 342 buoyes to the top position, the upper float 342 can render the water feed pipe 304 to stop feeding water. Besides, because of control of the water feed pipe 304 and the upper float 342 in the upper water tank 20, no more water is fed when the upper water tank 20 is fully loaded, therefore, provision of the water spilling pipe 204 and the water complementary pipe 203 is unnecessary here in this embodiment, complementing function of water of the water complementary pipe 203 is substituted by the upper intake pipe 302. Other structural members in this variation, such as the lower water tank 10, the upper water tank 20 and the rotatable knob set 40 are unchanged. Moreover, in this variation, small flushing water can be afforded by the lower water tank 10, and also can be afforded by the upper water tank 20, it only needs to change slightly the positions of the second and the first drag stems 404, 403, so that when the rotatable knob 401 is turned to result a small flushing of water, the second drag stem 404 will pull up the upper floating plug 202 for opening; when in large water flushing, the lower and the upper floating plugs 102, 202 can be opened simultaneously.

Having thus described my invention, what I claim as new and desire to be secured by Letters Patent of the United States is:

1. A toilet structure for flushing a nightstool having a ring of holes formed in an upper periphery thereof and a whirling water feed outlet formed in a lower portion thereof, comprising:

a flushing water container comprising an upper water tank and a lower water tank;

said lower water tank having a lower outlet on the bottom thereof, said lower outlet having a lower floating plug connected at one end thereof, the other end of said lower outlet being adapted for connection to said whirling water feed outlet, said lower floating plug being used to control the opening and closing of said lower outlet;

said lower water tank further having a connecting pipe extending through a front side thereof, said connecting pipe having an end located eternally of said lower water tank and adapted for connection to said ring of holes and an opposite end located inwardly of said front side and bent upwardly;

said lower water tank having a water spillover pipe fluidly connected with said lower outlet, the top of said spillover pipe being slightly higher than the full water level in said lower water tank;

said upper water tank being fixedly connected to an upper portion of said lower water tank and having an upper outlet connected to a bottom thereof, an end of said upper outlet being connected to the opposite end of said connecting pipe, the other end of said outlet having an upper floating plug connected thereto for controlling the opening and closing of said upper outlet;

a water spilling pipe provided on a lateral side of said upper water tank, said water spilling pipe being positioned slightly higher than the full water level in said upper water tank, the outlet of said water spilling pipe being connected to said lower water tank such that excess water in said upper water tank is spilled into said lower water tank;

a float controlled water inlet mechanism adapted for connection to a building water supply system, said mechanism including a lower intake pipe and an upper intake pipe, said lower intake pipe for feeding water from said supply system to said lower water tank and said upper intake pipe for feeding water from said supply system to said upper water tank, said float being located in said lower water tank and responsive to the water level therein to admit water to said intake pipes and to stop the flow of water thereto when said full water level in said lower water tank is reached; and a rotatable knob set comprising a rotatable knob, a linkage connected to said rotatable knob, and a first drag stem and a second drag stem connected to said linkage, said rotatable knob being located on an external surface of said lower water tank, one end of said linkage being connected to said rotatable knob for rotational movement therewith, said linkage having a portion located in said lower water tank and a portion located in said upper water tank, said first drag stem being located on said portion of said linkage in said lower water tank and having a first dragging chain connected thereto and to said lower floating plug, said second drag stem being located on said portion of said linkage in said upper water tank and having a second dragging chain connected thereto and to said upper floating plug; wherein, when said upper and lower water tanks are at their full water levels and said rotatable knob is turned in a first direction, said first drag stem is rotated to lift said first dragging chains and said lower floating plug whereby water in said lower water tank flows therefrom to said whirling water feed outlet to flush urine from said nightstool and form a new water seal therein, the lowering of the water level in said lower water tank causing said float to fall and admit water from said building supply system through said lower and upper intake pipes, said lower intake pipe supplying water directly to said lower water tank and said upper intake pipe supplying excess water to said upper water tank, the excess water spilling into said spilling pipe and into said lower water tank to speed the filling of said lower water tank; and, when said rotatable knob is rotated in a second direction, said first and second drag stems are both rotated to lift said first and second dragging chains and said upper and lower floating plugs whereby water from said upper water tank flows therefrom to said ring of holes and water in said lower water tank flows therefrom to said whirling water feed outlet to flush nightsoil from said nightstool.

2. A toilet structure as in claim 1 wherein a rubber washer is provided at the connection between the front side of said lower water tank and said connecting pipe.

3. A toilet structure as in claim 1 further comprising a complementary water pipe for forming a water seal in said nightstool, said complementary water pipe being connected to said water spillover pipe, said complementary water pipe being provided on a lateral side of said upper water tank at the same level as said water spilling pipe, water output of said complementary water pipe being controlled by a control knob, such that superfluous water in said upper water tank can flow through said water complementary pipe, said water spillover pipe, and said lower outlet to complete the water seal in said nightstool.

4. A toilet structure as in claim 1 wherein a plurality of fixing holes are provided in said first and second drag stems and in said linkage such that said first and second drag stems are slipped over said linkage and are fixed in position thereon by pins inserted in said fixing holes.

* * * * *